United States Patent
Hall et al.

(10) Patent No.: US 10,732,294 B1
(45) Date of Patent: Aug. 4, 2020

(54) ON-ORBIT REPROGRAMMABLE DIGITAL SIGNAL GENERATOR SYSTEM FOR GENERATION OF HOPPING MULTI-BAND GLOBAL POSITIONING SYSTEM SIGNALS

(71) Applicant: Northrop Grumman Systems Corporation, Falls Church, VA (US)

(72) Inventors: Dennis M. Hall, Manhattan Beach, CA (US); Kiet D. Ngo, Hermosa Beach, CA (US); Marlon E. Marquez, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 749 days.

(21) Appl. No.: 15/368,928

(22) Filed: Dec. 5, 2016

Related U.S. Application Data

(60) Provisional application No. 62/285,024, filed on Jan. 21, 2016.

(51) Int. Cl.
    *G01S 19/36* (2010.01)
(52) U.S. Cl.
    CPC .................. *G01S 19/36* (2013.01)
(58) Field of Classification Search
    CPC ...................................................... G01S 19/36
    USPC .................................................. 342/357.76
    See application file for complete search history.

(56) References Cited

U.S. PATENT DOCUMENTS

| | | | |
|---|---|---|---|
| 5,781,156 A | 7/1998 | Krasner | |
| 6,542,821 B2 | 4/2003 | Krasner | |
| 7,978,747 B1 * | 7/2011 | Harris | H04B 1/707 370/328 |
| 8,036,255 B1 | 10/2011 | Harris et al. | |
| 8,199,837 B2 | 6/2012 | Karabinis | |
| 2002/0022465 A1 | 2/2002 | McCullagh et al. | |

OTHER PUBLICATIONS

Davenport, R.G.; FFT Processing of Direct Sequence Spreading Codes Using Modern DSP Microrprocessors; National Aerospace and Electronics Conference, Dayton, Ohio, May 20-24, 1991; IEEE; pp. 98-105.
Carroll, T.L.; Chaotic communications that are difficult to detect; Physical Review E, vol. 67, 026207 (2003); The American Physical Society; 2003; pp. 026207-1-026207-6.
Venkitasubramaniam, P. et al; Relay Secrecy in Wireless Networks with Eavesdroppers' 44th Allerton Conference on Communication, Control and Computing, Sep. 2006; 7 pages.

* cited by examiner

*Primary Examiner* — Bo Fan
(74) *Attorney, Agent, or Firm* — McCracken & Gillen LLC

(57) ABSTRACT

A system for generating a frequency hopping Global Positioning System (GPS) system includes: an on-orbit reprogrammable digital waveform generator (ORDWG) configured to generate a GPS signal comprising a resilient frequency-hopping spread spectrum GPS signal that hops at a hop rate between two or more GPS channels, the GPS signal further comprising a legacy direct-sequence spread spectrum signal for at least two of the two or more GPS channels; and a receiver configured to receive the GPS signal, the radio further configured to decode the GPS signal.

12 Claims, 4 Drawing Sheets

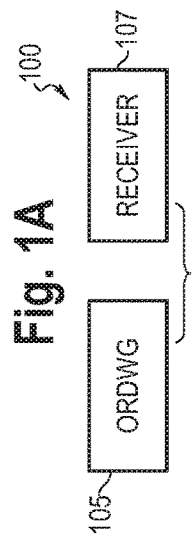
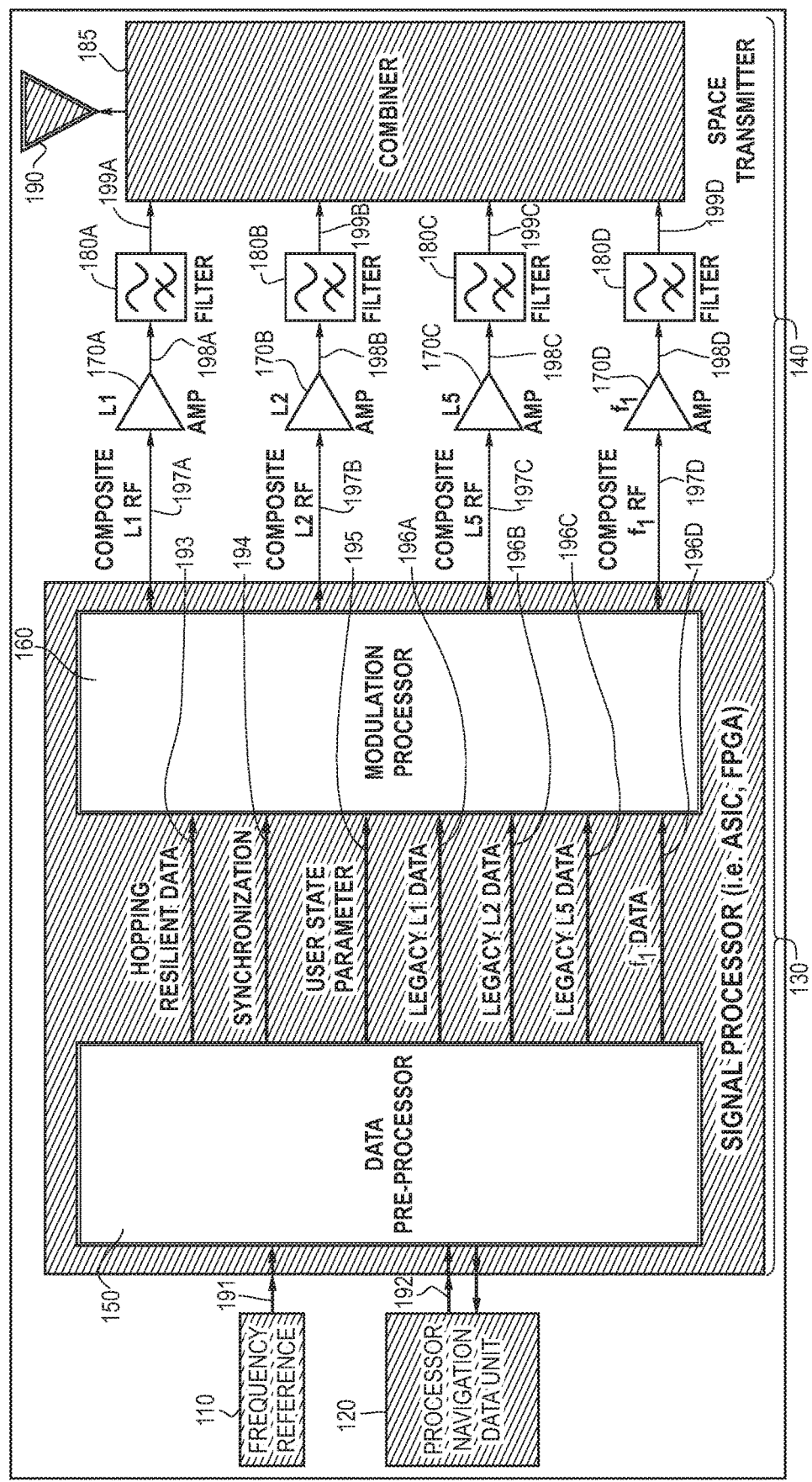

| User State | Processor Navigation Data Unit | L1 MOD ENABLE STATUS | L2 MOD ENABLE STATUS | L5 MOD ENABLE STATUS | $f_1$ MOD ENABLE STATUS | L1 OUTPUT SIGNAL | L2 OUTPUT SIGNAL | L5 OUTPUT SIGNAL | $f_1$ OUTPUT SIGNAL |
|---|---|---|---|---|---|---|---|---|---|
| 1 | 001 | | 1 | | | | ∿ | | |
| 2 | 000 | 1 | | | | ∿ | | | |
| 3 | 010 | | | 1 | | | | ∿ | |
| 4 | 010 | | | 1 | | | | ∿ | |
| 5 | 000 | 1 | | | | ∿ | | | |
| 6 | 000 | 1 | | | | ∿ | | | |
| 7 | 011 | | | | 1 | | | | ∿ |

ON-ORBIT REPROGRAMMABLE DIGITAL SIGNAL GENERATOR SYSTEM FOR GENERATION OF HOPPING MULTI-BAND GLOBAL POSITIONING SYSTEM SIGNALS

PRIORITY CLAIM

This application claims priority to U.S. Provisional Application No. 62/285,024, filed Jan. 21, 2016, entitled "ON-ORBIT REPROGRAMMABLE DIGITAL SIGNAL GENERATOR SYSTEM FOR GENERATION OF HOPPING MULTI-BAND GLOBAL POSITIONING SYSTEM SIGNALS".

SUMMARY

A system for generating a frequency hopping Global Positioning System (GPS) system includes: an on-orbit reprogrammable digital waveform generator (ORDWG) configured to generate a GPS signal comprising a resilient frequency-hopping spread spectrum GPS signal that hops at a hop rate between two or more GPS channels, the GPS signal further comprising a legacy direct-sequence spread spectrum signal for at least two of the two or more GPS channels; and a receiver configured to receive the GPS signal, the radio further configured to decode the GPS signal.

A system for generating a frequency hopping Global Positioning System (GPS) signal includes: an on-orbit reprogrammable digital waveform generator (ORDWG) comprising a frequency reference and a navigation data unit, the frequency reference configured to provide frequency reference data; the navigation data unit configured, using the frequency reference, to generate a GPS signal comprising a resilient frequency-hopping spread spectrum GPS signal that hops between two or more GPS channels, the GPS signal further comprising a legacy direct-sequence spread spectrum signal for at least two of the two or more GPS channels; and a receiver configured to receive the GPS signal and decode the GPS signal.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

FIG. 1A is a block diagram of the architecture of a system for generating a frequency hopping Global Positioning System (GPS) signal.

FIG. 1B is a block diagram of the architecture of an on-orbit reprogrammable digital waveform generator (ORDWG) for a system for generating a frequency hopping Global Positioning System (GPS) signal.

DETAILED DESCRIPTION

Figure 2:
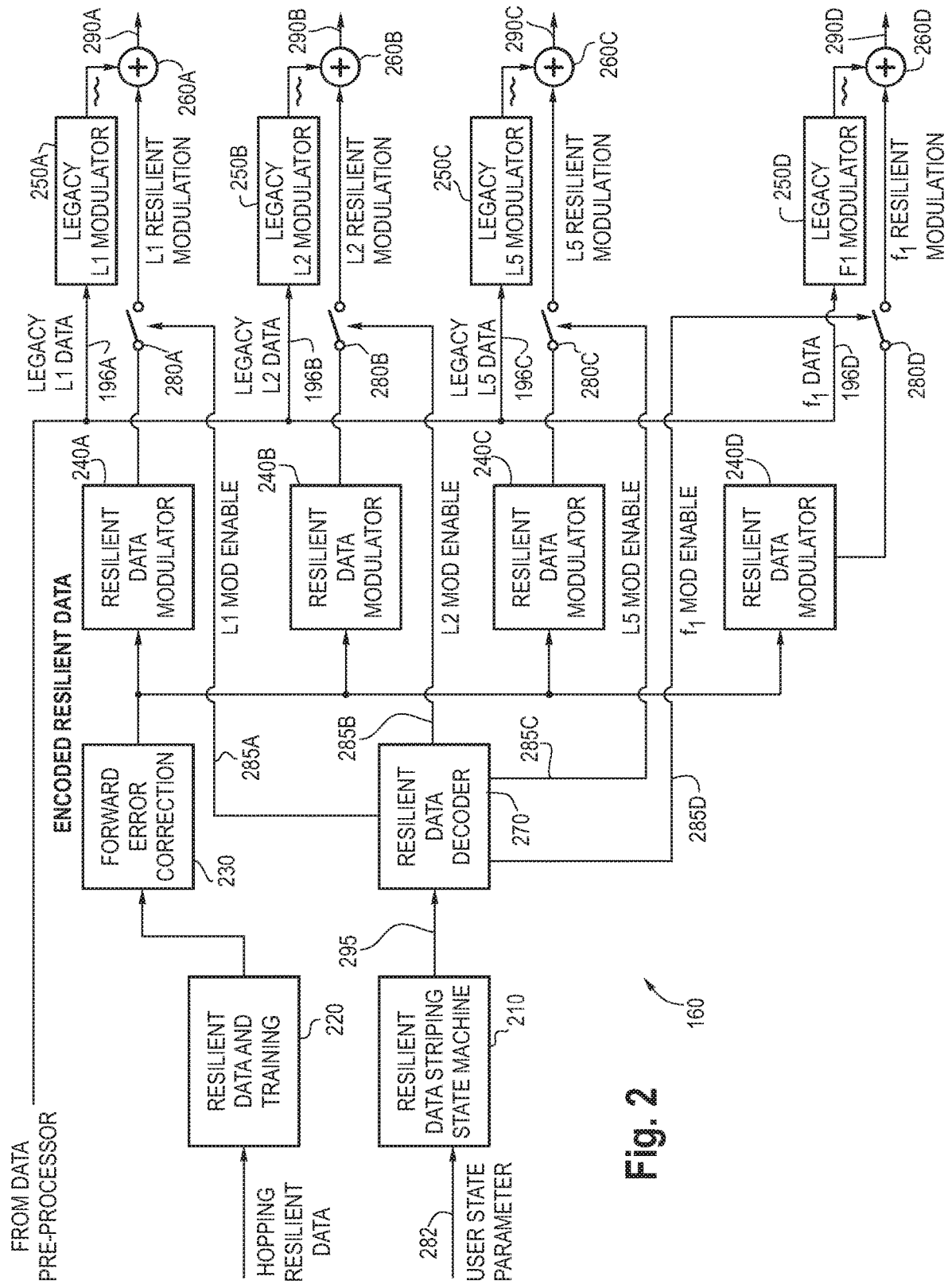
FIG. 2 is a block diagram of the architecture of a system for generating a frequency hopping Global Positioning System (GPS) signal.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention provide a innovative anti-jam hopping multi-band global positioning system (GPS) signal that can be efficiently generated by one or more of a single transmit antenna and a phased array system. Embodiments of the invention provide an innovative anti-jam hopping multi-band GPS signal that can be efficiently received by one or more of a dedicated receiver and a software-defined radio. For example, the dedicated receiver comprises a multi-band, synchronous dedicated receiver.

The disclosed invention is a frequency hopping Global Positioning System (GPS) signal that is backward compatible with existing GPS signals. On the receiving side, the invention uses one or more a dedicated receiver and a software-defined radio to dehop and utilize the additional GPS signal.

Embodiments of the invention uses a directly synthesized digital signal generator over a selectable subset of these bands to frequency hop (multiple hops per direct sequence chip) a positioning, navigation, and timing (PNT) signal in order to mitigate single band jammers. This modulation and signal invention provides a robust signal that requires a much more complex jammer to gain an advantage relative to a single band system.

An on-orbit reprogrammable digital waveform generator (ORDWG) generates a resilient military signal featuring frequency hopping over two or more GPS bands in an anti-access/area denial (A2AD) environment. The signal comprises a hybrid of a frequency-hopping spread spectrum (FHSS) signal and a direct-sequence spread spectrum (DSSS) signal.

Military receivers can acquire the hybrid signal by using transmission security (transec)-generated frequency agility to receive both the direct sequence modulation and the hopping signal(s).

According to embodiments of the invention, the ORDWG generates a coherent multi-band signal-hopping signal more quickly than the direct sequence chip rate to realize excellent anti-jam performance. The hopping makes jamming each direct sequence chirp more difficult.

A processor navigation data unit generates a hopping sequence using an algorithm known both to the transmitter and receiver. The hopping sequence appears to an adversary to be a random hopping sequence. In fact, the data comprises the legacy data and resilient data frame modulation blocks that are transmitted over one of the available RF modulation channels.

Alternatively, or additionally, resilient data frame modulation blocks are transmitted in a given increment of time or another state parameter on two or more of the available RF modulation channels. For example, the available RF modulation channels comprise one or more of L1, L2, L5, a first other frequency band $f_1$ and a second other frequency band $f_2$.

At least one of the transmitter's available RF modulation channels has an associated resilient data modulator. Preferably, but not necessarily, each of the RF modulation channels has an associated resilient data modulator. The processor navigation data unit selects one of the decoder outputs, which sends the resilient signal received by the corresponding modulator to the corresponding summer to be added to the legacy data. A user state parameter is an input to the resilient data striping state machine.

The resilient data striping state machine translates the user state parameter into a control signal that determines which resilient data modulator is used at a given point in time.

The user state parameter controls which resilient data modulator is selected by the resilient data striping state machine.

If a given RF modulation channel is not selected by the processor navigation data unit, a corresponding summer will simply output the existing legacy data. The outputs of the different summers are then added by the signal processor unit and combined into a single signal processor unit output.

Receivers will have the same RF hopping sequence as the transmitter, and will be able to reassemble the hopping resilient data blocks. In other words, if a given RF modulation channel is selected by the processor navigation data unit, the RF modulation channel will comprise an approximate linear combination of the existing legacy signal and the additional resilient data modulation. For example, the RF modulation channel comprises an approximate sum of the existing legacy signal and the additional resilient data modulation. If a given transmitter RF modulation channel is not selected by the processor navigation data unit, its output will simply be the existing legacy data.

FIG. 1A is a block diagram of the architecture of a system for generating a frequency hopping Global Positioning System (GPS) signal.

A system 100 for generating a frequency hopping GPS signal comprises an on-orbit reprogrammable digital waveform generator (ORDWG) 105 and a receiver 107.

FIG. 1B is a block diagram of the architecture of an on-orbit reprogrammable digital waveform generator (ORDWG) 105 for a system for generating a frequency hopping Global Positioning System (GPS) signal.

The ORDWG 105 comprises a frequency reference 110, a navigation data unit 120, a signal processor unit 130 operationally connected to the frequency reference 110 and operationally connected to the navigation data unit 120, and a transmission unit 140 operationally connected to the signal processor unit 130.

The frequency reference 110 is configured to provide one or more of system clocking data and a system synchronization reference. For example, the system clocking comprises clock timing information.

The navigation data unit 120 comprises one or more of a computer, a processor, and another navigation data unit. On legacy systems, the navigation data unit 120 populates transmitted legacy RF datagrams over one or more of L1, L2, L5, and a first other frequency band $f_1$. The navigation data unit 120 populates transmitted legacy RF datagrams over one or more of L1, L2, L5, and the first other frequency band $f_1$, and the navigation data unit also performs one or more of hopping resilient data generation and user state synchronization.

The navigation data unit 120 is configured to generate a hopping direct sequence navigation signal that is momentarily in one of the bands and quickly jumps to another band. For example, the navigation data unit 120 may be configured to generate a hopping direct navigation signal that makes a jump within a period of approximately 33 nanoseconds.

The signal processor unit 130 is configured to generate one or more of three navigation signals (L1, L2, and L5) used by existing established GPS services. Alternatively, or additionally, the signal processor unit 130 is configured to generate a navigation signal in one or more other frequency bands $f_1$ and $f_2$ available to GPS services. In this example, the signal processor unit 130 generates a navigation signal in another frequency band $f_1$.

The signal processor unit 130 comprises one or more of an application-specific integrated circuit (ASIC) 130 and a field programmable gate array (FPGA) 130.

The signal processor unit 130 comprises a data pre-processor unit 150 and a modulation processor unit 160. The data pre-processor unit 150 receives frequency reference data from the frequency reference 110 via first pathway 191. The data pre-processor unit 150 receives navigation data from the navigation data unit 120 via second pathway 192. The navigation data received by the data pre-processor unit 150 from the navigation data unit 120 via the second pathway 192 comprises the legacy RF datagrams over one or more of L1, L2, L5, and the first other frequency band $f_1$. The navigation data received by the data pre-processor unit 150 from the navigation data unit 120 via the second pathway 192 further comprises the hopping resilient data. The navigation data unit 120 and the data pre-processor unit 150 work together to accurately control synchronization, to generate the user state parameter, and to output hopping resilient data.

The data pre-processor unit 150 transmits the hopping resilient data to the modulation processor 160 via third pathway 193.

The data pre-processor unit 150 uses one or more of the frequency reference data and the navigation data to generate synchronization data suitable for synchronizing two or more of the L1, L2, L5, and $f_1$ bands. The data pre-processor unit 150 then transmits the synchronization data to the modulation processor 160 via fourth pathway 194.

The data pre-processor unit 150 uses one or more of the frequency reference data and the navigation data to generate a user state parameter that the data pre-processor unit 150 transmits to the modulation processor 160 via fifth pathway 195.

The data pre-processor unit 150 uses one or more of the frequency reference data and the navigation data, which comprises the legacy RF datagrams over one or more of L1, L2, L5, and the first other frequency band $f_1$, to generate legacy RF transmission signals over one or more of L1, L2, L5, and the first other frequency band $f_1$.

The data pre-processor unit 150 then frames the RF transmission signal data for one or more of the L1, L2, L5, and $f_1$ bands for modulation, thereby producing RF transmission signals suitable for transmission by the modulation processor block 160. The data pre-processor unit 150 transmits the RF transmission signal for the L1 band to the modulation processor 160 via seventh pathway 196A. The data pre-processor unit 150 then transmits the RF transmission signal for the L2 band to the modulation processor 160 via eighth pathway 196B. The data pre-processor unit 150 then transmits the RF transmission signal for the L5 band to the modulation processor 160 via ninth pathway 196C. The data pre-processor unit 150 then transmits the RF transmission signal for the $f_1$ band to the modulation processor 160 via tenth pathway 196D.

The modulation processor block 160 functions as a modulator for the system 100, receiving frequency reference data via the first pathway 191, receiving the navigation data via the second pathway 192, and generating needed RF signals using a sequence known to both the transmission unit 140 and to a ground receiver. Both the transmitter in space and the receiver on the ground knows which channel is being used for a given state parameter. For example, both the transmitter and receiver know which channel is being used at a given time.

The modulation processor block 160 transmits the hopping resilient data within one or more existing channels L1, L2, L5, and $f_1$ without significantly degrading signal quality in any of the channels L1, L2, L5, and The transmission unit 140 is configured to receive the signal from the signal processor unit 130, to prepare the signal for transmission, and to transmit the signal into space. For example, the transmission unit 140 transmits the signal into space.

The transmission unit 140 comprises amplifiers 170A-170D, filters 180A-168D, an optional combiner 185, and an antenna 190. The amplifiers 170A-170D comprise one or more of traveling wave tube amplifiers, solid state power amplifiers in a single antenna configuration, solid state power amplifiers in a phased array antenna configuration, and other amplifiers.

The amplifier 170A is operationally connected to the modulation processor 160 via eleventh pathway 197A. The amplifier 170B is operationally connected to the modulation processor 160 via twelfth pathway 197B. The amplifier 170C is operationally connected to the modulation processor 160 via thirteenth pathway 197C. The amplifier 170D is operationally connected to the modulation processor 160 via fourteenth pathway 197D.

The filters 180A-180D comprise one or more of bandpass filters 180A-180D and other filters 180A-180D. The filters 180A-180D are operationally connected to the respective amplifiers 170A-170D via respective pathways 198A-198D.

The combiner 185 is operationally connected to the respective filters 180A-180D via respective pathways 1999A-199D.

The antenna 190 is operationally connected to the combiner 185. In case of embodiments lacking the optional RF combiner 185, the antenna 199 is directly operationally connected to the respective filters 180A-180D.

FIG. 2 is a block diagram of a system 200 for generating a frequency hopping GPS signal. The system 200 comprises the signal processor unit 130 and a resilient data striping state machine 230. Internal datapath switches are shown to demonstrate operation of the signal processor unit 130 but will probably not take this precise form in actual practice. In the depicted example, the L2 frequency band has been selected for resilient transmission.

As shown in FIG. 2, the signal processor unit 130 is operably connected to a resilient data striping state machine 210.

The signal processor unit 130 comprises a resilient data and training block 220 configured to receive hopping resilient data, a forward error correction block 230 operably connected to the resilient data and training block 220, resilient data modulators 240A-240D, legacy modulators 250A-250D, summers 260A-260D, and a resilient data decoder 270 that is operably connected to one or more of the legacy modulators 250A-250D.

One or more of the resilient data modulators 240A-240D are operably connected to the forward error correction block 230. One or more of the legacy modulators 250A-250D are operably connected via respective pathways 196A-196D to the resilient data striping state machine 210. One or more of the summers 260A-260D are operably connected to a respective legacy modulator 250A-250D. One or more of the summers 260A-260D are further operably connected via a respective datapath switch 280A-280D to a respective resilient data modulator 240A-240D.

The resilient data striping state machine 210 synchronizes resilient signals using a user state parameter 282. For example, the user state parameter 282 comprises time. For example, the user state parameter 282 comprises another user state parameter 282 other than time. For example, the user state parameter 282 is incremented by one each time it is incremented. For example, an increment of one represents a quantum of transmitted bits. For example, an increment of one represents a block of 128 bits.

Upon receipt of the user state parameter 282, the resilient data striping state machine 210, the resilient data striping state machine 210 pseudo-randomly selects one of the RF modulation channels L1, L2, L5, and $f_1$. Using the user state parameter 282, the resilient data striping state machine 210 produces a pseudo-random multi-bit control signal 288 comprising N bits. The resilient data striping state machine translates the user state parameter 282 into the control signal 288 that determines which resilient data modulator 240A, 240B, 240C, 240D is used at a given point in time.

For example, the resilient data striping state machine 210 produces a multi-bit control signal 288 comprising a value of one of 000, 001, 010, and 011. Each of the values of the multi-bit control signal 288 corresponds to one channel. For example, 000 corresponds to L1, 001 corresponds to L2, 010 corresponds to L5, and 011 corresponds to the first other frequency band $f_1$.

The control signal 288 output by the resilient data striping state machine 210 is passed to the resilient data decoder 270. For example, the resilient data decoder 270 has a 1 to 1 correlation between the value of the control signal 288 and the corresponding resilient data modulator 240A, 240B, 240C, and 240D that is enabled. For example, if the value of the control signal 288 is 000, then the L1 resilient data modulator 240A will be selected.

If a given RF modulation channel is not selected by the processor navigation data unit, the corresponding summer will simply output the existing legacy data. The outputs of the different summers are then added by the signal processor unit and combined into a single signal processor unit output.

The navigation data unit (item 120 in FIG. 1) uses the received frequency reference data to set the user state parameter 282 so as to substantially synchronize clocks for the resilient data modulators 240A, 2406, 240C, and 240D.

A legacy navigation signal flows into the modulation processor unit 160 from the data pre-processor (not shown) via one or more respective pathways 196A-196D and is received by the respective legacy modulators 250A-250D.

In this example, the legacy modulator 250A comprises a legacy L1 modulator, the legacy modulator 250B comprises a legacy L2 modulator, the legacy modulator 250C comprises a legacy L5 modulator, and the legacy modulator 250D comprises a legacy $f_1$ modulator.

The resilient data and training block 220 receives the hopping resilient data and forwards the hopping resilient data to the forward error correction block 230. In the forward error correction block 230, at least one of the data blocks is forward error correction encoded to ensure correct transmission even in the event of a dropped block. Preferably, although not necessarily, each of the data blocks is forward error correction encoded. The forward error correction block 230 forwards the forward error corrected data blocks to one or more of resilient data modulators 240A, 240B, 240C, and 240D.

The resilient data striping state machine 210 generates a resilient navigation signal comprising one or more resilient data frames. The resilient navigation signal comprises N data blocks, where N is the number of different RF modulation channels. For example, N=4, and the RF modulation channels are L1, L2, L5, and $f_1$. At least one of the data blocks is transmitted at a single RF modulation channel. Preferably, although not necessarily, each of the data blocks is transmitted at a single RF modulation channel. Preferably, although not necessarily, each RF modulation channel occupies a distinct waveband that does not overlap the waveband occupied by each of the other RF modulation channels.

The resilient data striping state machine 210 transmits the resilient navigation signal to the resilient data decoder 270.

The resilient data decoder 270 receives the pseudo-randomly selected RF modulation channel from the resilient data striping state machine. The resilient data decoder 270 then routes the selected resilient navigation signal via the selected pathway 285A, 285B, 285C, or 285D to the selected respective datapath switch 280A, 280B, 280C, or 280D, thereby activating the selected respective resilient data modulator 240A, 2406, 240C, or 240D.

In this example, a resilient L2 data control signal is generated by the resilient data striping state machine 210, received by the resilient data decoder 270, and transmitted over pathway 285B to the selected datapath switch 280B, which activates the selected resilient data modulator 240B. In the selected channel, in this case, L2, the summer 260B adds resilient modulated data to the existing legacy RF modulation channel 250B. In the non-selected channels, in this case, L1, L5, and $f_1$, the summers 270A, 270C, and 270D transmit the respective existing legacy RF modulation channels 250A, 250C, and 250D.

According to an alternative embodiment, instead of the resilient data striping state machine, the resilient data decoder 270 decodes a multi-bit control value received from the resilient data striping state machine, then pseudo-randomly selects a RF modulation resilient data channel and disables the other resilient data modulators 240A and 240C-240D.

According to this alternative embodiment, the resilient data decoder 270 then routes the selected resilient data control signal via the selected pathway 285A, 285B, 285C, or 285D to the selected respective datapath switch 280A, 280B, 280C, or 280D, thereby activating the selected respective resilient data modulator 240A, 240B, 240C, or 240D.

The other RF modulation resilient data channels—in this example, L1, L5, and $f_1$—are de-selected. All resilient data modulators 240A, 240B, 240C, and 240D may receive resilient data, but only the modulation block that is selected by the resilient striping state machine 210 (or in alternative embodiments that is selected by the resilient data decoder 270), in this example, the resilient data modulator 240B, will transmit the resilient data.

The selected resilient data modulator 240B sends the resilient data via the selected datapath switch 280B to the summer 260B. The non-selected respective resilient data modulators 240A, 240C and 240D do not send resilient data on via the non-selected datapath switches 280A, 280C and 280D to the non-selected summers 260A, 260C and 260D.

The data pre-processor unit (not shown) outputs the respective output of summers 260A, 260B, 260C, and 260D via respective pathways 290A, 290B, 290C, and 290D.

Figures 3, 4:
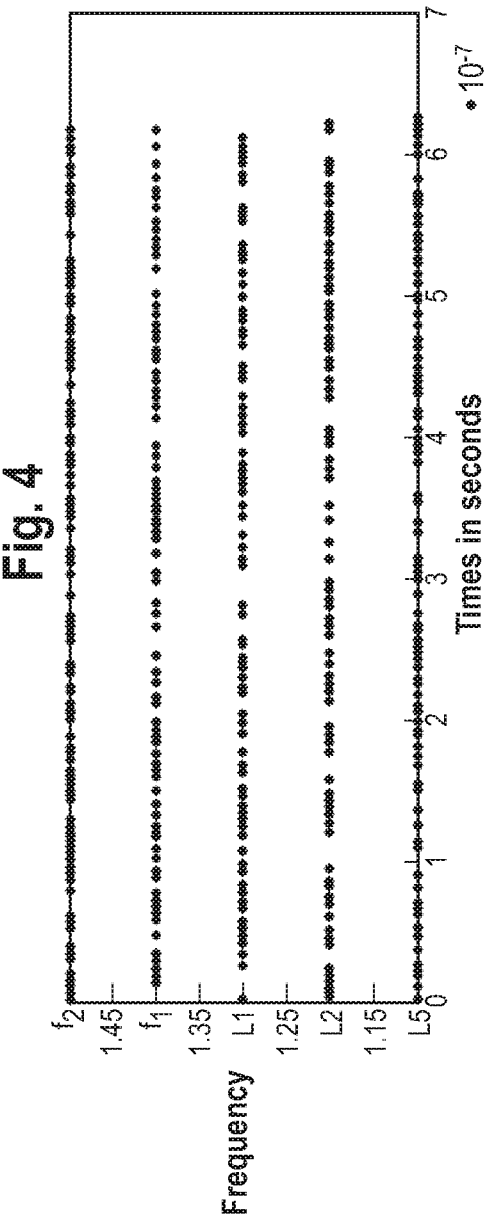
FIG. 3 is an exemplary chart showing a sequence of seven hops by a system for generating a frequency hopping GPS signal.
FIG. 4 is an exemplary graph of frequency versus time for a system for generating a frequency hopping Global Positioning System (GPS) signal.

FIG. 3 is an exemplary chart showing a sequence of seven hops by a system for generating a frequency hopping GPS signal. The chart includes columns showing for each hop a user state, a processor navigation data unit output, enablement status of the resilient L1 modulator, enablement status of the resilient L2 modulator, enablement status of the resilient L5 modulator, enablement status of the resilient $f_1$ modulator, L1 signal output by the system, L2 signal output by the system, L5 signal output by the system, and $f_1$ signal output by the system. The chart shows that at each point in time, only one of the four frequency bands is outputting a signal, and the particular band outputting a signal at a particular point in time quickly hops around, rendering jamming the signal extremely difficult if not impossible.

FIG. 4 is an exemplary graph of frequency versus time for a system for generating a frequency hopping GPS signal.

The resilient data striping state machine produces a pseudo-random multi-bit control value. For example, in the case of a four-channel system (N=4), the resilient data striping state machine produces a multi-bit control value comprising one of 000, 001, 010, and 011. Each of the multi-bit control values corresponds to one channel. For example, 000 corresponds to L1, 001 corresponds to L2, 010 corresponds to L5, and 011 corresponds to the other frequency band $f_1$.

As can be seen, the system hops between the four different wavelengths multiple times in each $10^{-7}$ seconds. For example, the system hops pseudo-randomly between the four different wavelengths multiple times in each $10^{-7}$ seconds.

Figure 5:
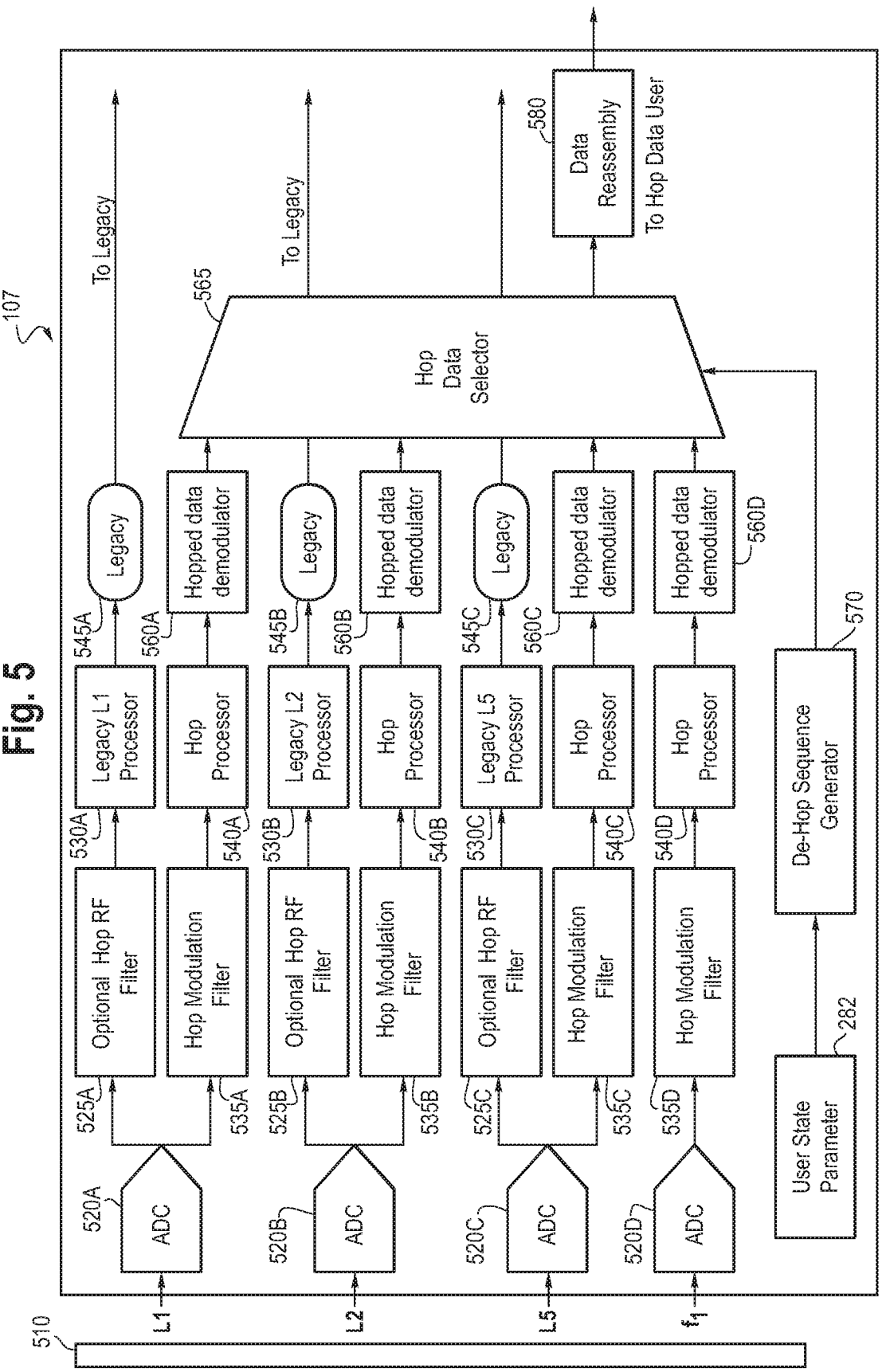
FIG. 5 is a schematic block diagram of a receiver for a system for receiving a frequency hopping GPS signal.

FIG. 5 is a schematic block diagram of a receiver 107 for a system for receiving a frequency hopping GPS signal.

The receiver 107 comprises a channelizer 510 configured to separate the received signal into channels; analog-to-digital converters (ADCs) 520A-520D configured to receive the separated signal from the channelizer 510, the ADCs 520A-520D further configured to digitize the separated signal; legacy processors 530A-530D operably connected to the ADCs 520A-520D, the legacy processors 530A-530D configured to process the legacy signal, the legacy processors 530A-530D further configured to transmit the processed legacy signal to a legacy user; hop modulation filters 535A-535D operably connected to the ADCs 520A-520D, the hop modulation filters 535A-535D configured to receive the digitized signal from the ADCs 520A-520D, the hop modulation filters 535A-535D further configured to perform one or more of removing and attenuating the digitized legacy signal; hop processors 540A-540D operably connected to the hop modulation filters 535A-535D, the hop processors 540A-540D configured to receive the filtered resilient signal from the hop modulation filters 535A-535D, the hop processors 540A-540D further configured to process the filtered resilient signal, hopped data demodulators 560A-560D configured to receive the processed resilient signal from the respective hop processors 540A-540D, the hopped data demodulators 560A-560D further configured to demodulate the processed resilient signal; a data selector 565 configured to receive the demodulated resilient signal from the hopped data demodulators 560A-560D, the data selector 565 further configured to receive a hopping sequence from a de-hopping sequence generator 570, the data selector 565 further configured to use the hopping sequence to designate the resilient signal to transmit; the de-hopping sequence generator 570 configured to receive a user state parameter 282 from the de-modulation processor (not pictured), the de-hopping sequence generator 570 further configured to use the user state parameter 282 to generate the hopping sequence; and a data reassembly block 580 configured to receive the resilient signal from the data selector 565, the data reassembly block 580 further configured to receive the demodulated resilient data from the data selector 565, the data reassembly block 580 further configured to reassemble blocks of resilient data into a complete message, the data reassembly block 580 further configured to forward the reassembled message to a hop data user.

The received signal is received by an RF channelizer 510. The RF channelizer 510 separates the received signal into wavelength bands, directing each wavelength to a different one of the analog-to-digital converters (ADC's) 520A, 520B, 520C, and 520D. The received signal is then sensed by one of the ADC's, at least one of which is dedicated to one frequency band, one of L1, L2, L5, and $f_1$. Preferably, but not necessarily, one ADC is dedicated to each of the frequency bands L1, L2, L5, and $f_1$ (and $f_2$ if applicable). For example, as depicted, ADC 520A is dedicated to frequency band L1, ADC 520B is dedicated to frequency band L2, ADC 520C is dedicated to frequency band L5, and ADC 520D is dedicated to frequency band $f_1$. Alternatively, or additionally, a single ADC may be configured to view the entire RF spectrum and to sub-channelize the separate frequency bands, L1, L2, L5, and $f_1$. The ADC's 520A, 520B, 520C, and 520D are configured to digitize the respective received signals.

Optionally, the hopped signal may be removed by optional hop RF filters 525A, 525B, and 525C that are placed after the ADC's 520A, 520B, 520C, and 520D and before the legacy processors 530A, 530B, and 530C to which the data is relayed. This step is performed to improve the legacy processing signal to noise ratio and to reduce the noise bandwidth. Optional hop RF filters 525A, 525B, and 525C receive the signal from the ADC's 520A, 520B, 520C, and 520D. For example, the hopped signal may be removed from the data being relayed to the legacy processor using digital signal processing. Alternatively, or additionally, the hopped signal may be attenuated using digital signal processing. For example, the hopped signal may be attenuated by a factor of at least approximately ten using digital signal processing.

For legacy frequency bands, the incoming spectrum is processed for one or more of a legacy signal and a hop signal. The received sampled signal in a given frequency band will be relayed to one or more of the legacy processors 530A, 530B, and 530C, and a hop processor 540A, 540B, 540C, or 540D. Preferably, the received sampled signal in a given frequency band will be relayed to both the legacy processor 530A, 530B, and 530C and to the hop processor 540A, 540B, 540C, or 540D.

It is well known that the ionosphere delays signals in different frequency bands differently. With GPS systems, one of the dominant sources of error on the user range measurement is due to ionospherically induced delays. Existing ionospheric correction methods are modified so that ionospheric correction algorithms are applied over a short hop duration over which hopped data parameters are computed such as one or more pf phase, frequency, and symbol timing.

The additional hopping due to relaying the received sampled signal to the hop processors 540A, 540B, 540C, and 540D is designed so as not to degrade the performance of a legacy processor 530A, 530B, and 530C. The legacy processors 530A, 530B, and 530C process the legacy signals. For example, the legacy processors 530A, 530B, and 530C perform one or more of demodulating, de-spreading, recovering signal timing, compensating for ionospherically induced delays, and recovering carrier information from the legacy signals.

The legacy processors 530A, 530B, and 530C compensate for ionospherically induced delays using a legacy method that relies on existing legacy receiver inputs. For example, ionospheric compensation may be performed by comparing two different legacy modulations, for example, L1 and L2, and using a compensating digital signal processing (DSP) filter.

The legacy processors 530A, 530B, and 530C then send the processed legacy signals to an onboard microprocessor (not shown) for geolocation processing. Then the processed legacy signals are sent to respective legacy users via respective pathways 545A, 545B, and 545C.

The legacy signal is removed from the data being relayed to the hop processors 540A, 540B, 540C, and 540D by hop modulation filters 535A, 535B, 535C, and 535D. The hop modulation filters 535A, 535B, 535C, and 535D are configured to perform one or more of separating hop signals from the received signals, improving a hop data processing signal-to-noise ratio and reducing noise bandwidth. For example, the legacy signal may be removed from the data using digital signal processing filtering. Alternatively, or additionally, the legacy signal may be attenuated using digital signal processing. For example, the legacy signal may be attenuated by a factor of at least approximately ten using digital signal processing.

The hop processors 540A, 540B, 540C, and 540D have two potential methods for compensating for ionospherically induced delays. The first method, the legacy method, relies on existing legacy receiver inputs, for example, by comparing L1 and L2 modulations and using a compensating digital signal processing (DSP) filter. Training sequences can be used to determine the atmospheric tilt, allowing computation by the hop processors 540A, 540B, 540C, and 540D of ionospheric imperfections. However, the first compensation method cannot be trusted if a given frequency band is jammed.

The hop signals are then passed to hopped data demodulators 560A, 560B, 560C, and 560D, which are configured to demodulate the respective hop signals. The hopped data demodulators 560A, 560B, 560C, and 560D are also configured to perform traditional forward error correction (FEC) techniques to improve the bit error rate of the channel. The hopped data demodulators 560A, 560B, 560C, and 560D are configured, if enabled, to ensure that one or more of phase offset, symbol timing, and carrier tracking loops are only enabled during hopped modulation times. This precaution obviates the potential to wonder about the status of data transmission during times when no data is being received by one or more of the hopped data demodulators 560A, 560B, 560C, and 560D.

The second compensation method available to the hop processors 540A, 540B, 540C, and 540D entails using training mode packets and the hopping modulation signal, and comparing two modulations in two different frequency bands. The training mode packets may be interleaved with the resilient data packets in a plurality of frequency bands in order to calculate the ionospheric correction factors.

The hopped data demodulators 560A, 560B, 560C, and 560D transmit respective resilient data packets to a data selector 565. The data selector 565 receives a decoded resilient GPS signal recovered using a de-hopping sequence generator 570 that knows how the hopping sequence varies as user state parameter 282 varies. For example, the user state parameter 282 comprises time. Using user state parameters, the de-hopping sequence generator 570 selects a legacy modulator whose output is forwarded to data reassembly block 580. In this example, the selected legacy modulator is the L2 modulator. The data reassembly block 580 reassembles blocks of resilient data into a complete message, then forwards complete message a to a hop data user.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention. For example, virtually any frequency is theoretically available for use according to embodiments of the invention. For example, it is possible for more than one RF channel to receive the hopping resilient data in a given time increment. For example, it is possible for the invention to be operated at frequencies other than RF frequencies.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

We claim:

1. A system for generating a frequency hopping Global Positioning System (GPS) signal, comprising:
   an on-orbit reprogrammable digital waveform generator (ORDWG) comprising a frequency reference and a navigation data unit,
   the frequency reference configured to provide frequency reference data;
   the navigation data unit configured, using the frequency reference, to generate a GPS signal comprising a resilient frequency-hopping spread spectrum GPS signal that hops between two or more GPS channels, the GPS signal further comprising a legacy direct-sequence spread spectrum signal for at least two of the two or more GPS channels; and
   a receiver configured to receive the GPS signal and decode the GPS signal.

2. The system of claim 1, wherein the frequency reference data comprises one or more of system clocking data and a system synchronization reference.

3. The system of claim 1, wherein the hop rate exceeds a direct-sequence chirp rate.

4. The system of claim 1, wherein the GPS channels comprise two or more of L1, L2, L5, a first other frequency GPS band $f_1$ and a second other frequency GPS band $f_2$.

5. The system of claim 1, wherein the signal processor unit comprises one or more of an application-specific integrated circuit (ASIC) or a field programmable gate array (FPGA).

6. The system of claim 1, wherein the signal processor unit comprises a data pre-processor unit, and wherein the signal processor unit further comprises a modulation processor unit,
   wherein the data pre-processor unit is configured to receives frequency reference data from the frequency reference,
   wherein the data pre-processor unit is further configured to receive the navigation data from the navigation unit, and
   wherein the data pre-processor unit is further configured to transmit the hopping resilient data to the modulation processor.

7. The system of claim 6, wherein the data pre-processor unit is further configured to generate a user state parameter, the data pre-processor unit further configured to transmit the user state parameter to the modulation processor.

8. The system of claim 7, wherein the user state parameter includes time.

9. The system of claim 1, wherein the transmission unit comprises:
   an amplifier operationally connected to the signal processor;
   a filter operationally connected to the amplifier;
   a combiner operationally connected to the filter; and
   an antenna operationally connected to the combiner.

10. The system of claim 1, wherein the receiver comprises:
   a channelizer configured to separate the received signal into channels;
   an analog-to-digital converter (ADC) configured to receive the separated signal from the channelizer, the ADC further configured to digitize the separated signal;
   a legacy processor operably connected to an ADC, the legacy processor configured to process a legacy signal, the legacy processor further configured to transmit the processed legacy signal to a legacy user;
   a hop modulation filter configured to receive one or more of the resilient signal and the digitized legacy signal from the ADC, the hop modulation filter further configured to perform one or more of removing and attenuating the digitized legacy signal, the hop modulation filter further configured to transmit the resilient signal;
   a hop processor operably connected to the hop modulation filter, the hop processor configured to receive the filtered resilient signal from the hop modulation filter, the hop processor further configured to process the filtered resilient signal,
   a hopped data demodulator configured to receive the processed resilient signal from the hop processor, the hopped data demodulator further configured to demodulate the processed resilient signal;
   a data selector configured to receive the demodulated resilient signal from the hopped data demodulator, the data selector further configured to receive a hopping sequence from the de-hopping sequence generator, the data selector further configured to use the hopping sequence to designate the resilient signal to transmit;
   a de-hopping sequence generator configured to receive the user state parameter from the modulation processor, the de-hopping sequence generator further configured to use the user state parameter to generate a hopping sequence; and
   a data reassembly block configured to receive the resilient signal from the data selector, the data reassembly block further configured to receive the demodulated resilient data from the data selector, the data reassembly block further configured to reassemble blocks of resilient data into a complete message, the data reassembly block further configured to forward the reassembled message to a hop data user.

11. The system of claim 10, further comprising:
a hop RF filter that is operably connected to the ADC, the hop RF filter being further operably connected to the legacy processor, the hop RF filter being configured to use digital signal processing to perform one or more of removing and attenuating the resilient frequency-hopping spread spectrum GPS signal, the hop RF filter being further configured to receive the GPS legacy signal from the ADC, the hop RF filter being further configured to transmit the GPS legacy signal to the hopped data demodulator.

12. The system of claim 1, wherein the modulation processor unit comprises:
a resilient data striping machine configured to generate the resilient signal comprising one or more resilient data frames, the resilient data striping state machine further configured to select a resilient data channel over which to transmit the resilient signal;

a resilient data decoder operably connected to the resilient data striping state machine, the resilient data decoder configured to enable the selected resilient data channel by activating a selected datapath switch corresponding to the selected resilient data modulator so as to route the resilient data to the selected channel, the resilient data decoder further configured to disable the non-selected resilient data modulators;

a resilient data and training block configured to receive the resilient signal;

a forward error correction block operably connected to the resilient data and training block, the forward error correction block configured to receive the resilient signal from the resilient data and training block, the forward error correction block further configured to perform forward error correction encoding of the resilient data;

a selected resilient data modulator operably connected to the forward error correction block, the selected resilient data modulator becoming activated upon receipt from the forward error correction block of the resilient data;

a legacy modulator operably configured to receive the legacy signal; and a summer corresponding to the selected channel, the summer operably connected to the legacy modulator, the summer further operably connected via the selected datapath switch to the selected resilient data modulator, the summer configured to sum the resilient signal and the legacy signal, the summer further configured to output the sum.

* * * * *